United States Patent
Okada (10) Patent No.: US 8,730,508 B2
(45) Date of Patent: May 20, 2014

(54) IMAGE FORMING APPARATUS, METHOD OF CONTROLLING THE SAME, AND RECORDING MEDIUM

(75) Inventor: Tatsunori Okada, Takatsuki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 89 days.

(21) Appl. No.: 13/411,724

(22) Filed: Mar. 5, 2012

(65) Prior Publication Data

US 2012/0229853 A1    Sep. 13, 2012

(30) Foreign Application Priority Data

Mar. 9, 2011    (JP) .................................. 2011-051282

(51) Int. Cl.
G06F 15/00    (2006.01)
(52) U.S. Cl.
USPC ........................................................ 358/1.15
(58) Field of Classification Search
USPC ........................................................ 358/1.15
See application file for complete search history.

(56) References Cited

U.S. PATENT DOCUMENTS

| | | | |
|---|---|---|---|
| 7,869,063 B2 | 1/2011 | Fukano | |
| 2003/0120954 A1 | 6/2003 | Sugiyama | |
| 2005/0216514 A1 | 9/2005 | Murata | |
| 2007/0081186 A1 | 4/2007 | Numata | |
| 2009/0235341 A1 | 9/2009 | Hashimoto | |
| 2009/0316179 A1* | 12/2009 | Amiya et al. | 358/1.14 |
| 2010/0182643 A1* | 7/2010 | Ito | 358/1.15 |

FOREIGN PATENT DOCUMENTS

| | | |
|---|---|---|
| JP | 2002-049472 A | 2/2002 |
| JP | 2003-196069 A | 7/2003 |
| JP | 2005-024817 A | 1/2005 |
| JP | 2005-271317 A | 10/2005 |
| JP | 2005-316602 A | 11/2005 |
| JP | 2006-134046 A | 5/2006 |
| JP | 2006-343917 A | 12/2006 |
| JP | 2007-105937 A | 4/2007 |
| JP | 2008-197800 A | 8/2008 |
| JP | 2010-15537 A | 1/2010 |

OTHER PUBLICATIONS

Japanese Office Action (Notice of Ground of Rejection) dated May 21, 2013, issued by the Japanese Patent Office in corresponding Japanese Patent Application No. 2011-051282 and English language translation of Office Action. (11 pages).

* cited by examiner

Primary Examiner — Saeid Ebrahimi Dehkordy
(74) Attorney, Agent, or Firm — Buchanan Ingersoll & Rooney PC (57) ABSTRACT

An image forming apparatus is connectable to a print server in which a print job is stored. A determination unit of the image forming apparatus deletes a print job stored in the print server and determined to be not executable by the determination unit on condition that an instruction to delete the print job is input to an input unit.

19 Claims, 11 Drawing Sheets

| JOB | USER NAME | FILE NAME |
|---|---|---|
| (1) | xkawahata | test1.pdf |
| (2) | xkawahata | test2.pdf |
| (3) | xkawahata | test3.pdf |
| (4) | xkawahata | test4.pdf |
| (5) | xkawahata | test5.pdf |
| (6) | xkawahata | test6.pdf |
| (7) | xkawahata | test7.pdf |
| (8) | xkawahata | test8.pdf |
| (9) | xkawahata | test9.pdf |
| (10) | xkawahata | test10.pdf |
| ⋮ | ⋮ | ⋮ |
| (100) | xkawahata | test100.pdf |

FIG.6

| JOB | USER NAME | FILE NAME |
|---|---|---|
| (2) | xkawahata | test2.pdf |
| (3) | xkawahata | test3.pdf |
| (4) | xkawahata | test4.pdf |
| (5) | xkawahata | test5.pdf |
| (6) | xkawahata | test6.pdf |
| (7) | xkawahata | test7.pdf |
| (8) | xkawahata | test8.pdf |
| (9) | xkawahata | test9.pdf |
| (10) | xkawahata | test10.pdf |
| ⋮ | ⋮ | ⋮ |
| (100) | xkawahata | test100.pdf |

| JOB | USER NAME | FILE NAME | DELETION-COMPLETED FLAG |
|---|---|---|---|
| (1) | xkawahata | test1.pdf | OFF |
| (2) | xkawahata | test2.pdf | ON |
| (3) | xkawahata | test3.pdf | ON |
| (4) | xkawahata | test4.pdf | ON |
| (5) | xkawahata | test5.pdf | ON |
| (6) | xkawahata | test6.pdf | ON |
| (7) | xkawahata | test7.pdf | ON |
| (8) | xkawahata | test8.pdf | ON |
| (9) | xkawahata | test9.pdf | ON |
| (10) | xkawahata | test10.pdf | ON |
| ⋮ | ⋮ | ⋮ | ⋮ |
| (100) | xkawahata | test100.pdf | ON |

| JOB | USER NAME | FILE NAME | DELETION-COMPLETED FLAG | REGISTERED TIME |
|---|---|---|---|---|
| (1) | xkawahata | test1.pdf | OFF | Y1:D1:T1 |
| (2) | xkawahata | test2.pdf | ON | Y2:D2:T2 |
| (3) | xkawahata | test3.pdf | ON | Y3:D3:T3 |
| (4) | xkawahata | test4.pdf | ON | Y4:D4:T4 |
| (5) | xkawahata | test5.pdf | ON | Y5:D5:T5 |
| (6) | xkawahata | test6.pdf | ON | Y6:D6:T6 |
| (7) | xkawahata | test7.pdf | ON | Y7:D7:T7 |
| (8) | xkawahata | test8.pdf | ON | Y8:D8:T8 |
| (9) | xkawahata | test9.pdf | ON | Y9:D9:T9 |
| (10) | xkawahata | test10.pdf | ON | Y10:D10:T10 |
| ⋮ | ⋮ | ⋮ | ⋮ | ⋮ |
| (100) | xkawahata | test100.pdf | ON | Y100:D100:T100 |

IMAGE FORMING APPARATUS, METHOD OF CONTROLLING THE SAME, AND RECORDING MEDIUM

This application is based on Japanese Patent Application No. 2011-051282 filed with the Japan Patent Office on Mar. 9, 2011, the entire content of which is hereby incorporated by reference.

BACKGROUND OF THE INVENTION

1. Field of the Invention

The present invention relates to an image forming apparatus, and more particularly to an image forming apparatus receiving input of a print job, a method of controlling the same, and a recording medium.

2. Description of the Related Art

A pull print system has been implemented in which a print job (print data) is input from a print server to an image forming apparatus for execution. In such a system, the image forming apparatus requests the server to transmit a print job. In response, equipment such as a server transmits a print job to the image forming apparatus.

In such a system, if some error occurs after the image forming apparatus requests the server to transmit a plurality of print jobs, part of the plurality of requested print jobs fail to be received and executed. In this case, it is necessary to delete the print jobs accumulated in the server.

As for deletion of data in equipment on a network, a variety of techniques have been disclosed.

For example, Document 1 (Japanese Laid-Open Patent Publication No. 2010-015537) discloses a technique about deletion of a job stored in a mass storage attached to an image foaming apparatus. According to this technique, the user holds an IC (Integrated Circuit) card over a card reader connected to the image forming apparatus. Then, the user is identified by the IC card, and a list of jobs of the user that are stored in the mass storage is made. Then, if the user holds the IC card for a time longer than a prescribed time, all the listed jobs are deleted.

Document 2 (Japanese Laid-Open Patent Publication No. 2006-343917) discloses a method of controlling a printing apparatus when abnormality occurs in the printing apparatus. When abnormality occurs in the printing apparatus, a process mode that varies according to the factor of abnormality is specified. The process modes include a mode of deleting data in a reception buffer.

Document 3 (Japanese Laid-Open Patent Publication No. 2008-197800) discloses a technique concerning deletion of a print job in a case where a print job of printing more than one copy of image data serving as a print target is output from a print control apparatus to a printing apparatus and the print job is cancelled. In this technique, the header of the image data serving as a print target is given a job number specified by the print job and a serial number corresponding to the number of copies in the print job. Then, when the print job is deleted, the job number to be deleted is specified. The image data having this job number is collectively deleted.

In the pull print system as described above, when execution of a print job is cancelled in an image forming apparatus because of an error in the image forming apparatus or an error in billing to a user, the print job is left in the print server. Documents 1 to 3 do not mention deletion of the print job left on the print server. Therefore, in order to delete such a print job in the conventional pull print system, modifications to an application etc. may be required to delete the job in the server.

SUMMARY OF THE INVENTION

The present invention is made in view of such situations. An object of the present invention is to facilitate deletion of a print job which is accumulated in a print server and of which execution in an image forming apparatus is cancelled, without requiring modifications to an application etc. in the print server.

An image forming apparatus according to an aspect of the present invention is connectable to a print server in which a print job is stored. The image forming apparatus includes: an input unit for accepting an execution start instruction for the print job stored in the print server; a receiving unit for receiving the print job for which execution start instruction is input in the input unit, from the print server; and a determination unit for determining whether execution of the print job received from the print server is possible. The determination unit deletes the print job on condition that an instruction to delete the print job determined to be not executable by the determination unit is input to the input unit.

Another aspect of the present invention provides a method of controlling an image forming apparatus connectable to a print server in which a print job is stored. The image forming apparatus includes a storage device and an execution unit for executing image formation of print data. The method includes the steps of: accepting input of an execution start instruction for the print job stored in the print server; receiving the print job for which the execution start instruction is input, from the print server; determining whether execution of the print job received from the print server is possible; and deleting the print job determined to be not executable in the step of determining, on condition that an instruction to delete the print job is input.

A non-transitory, computer-readable recording medium according to a further aspect of the present invention is encoded with a program executable by a computer of an image forming apparatus including a storage device and an execution unit for executing image formation of print data. The image forming apparatus is connectable to a print server in which a print job is stored. The program causes the computer to execute the steps of: accepting input of an execution start instruction for the print job stored in the print server; receiving the print job for which the execution start instruction is input, from the print server; determining whether execution of the print job received from the print server is possible; and deleting the print job determined to be not executable in the step of determining, on condition that an instruction to delete the print job is input.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described with reference to the drawings. The same elements are denoted with the same reference numerals in the figures, and an overlapping description will not be repeated.

First Embodiment

<Overall Configuration of System>

Figure 1:
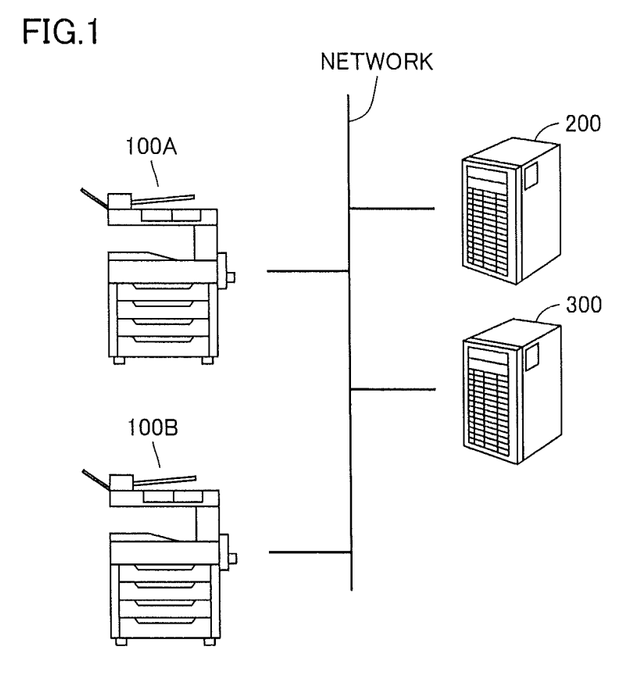
FIG. 1 is a diagram schematically showing an overall configuration of a pull print system using an MFP (Multi-Functional Peripheral) in a first embodiment of an image forming apparatus in the present invention.

FIG. 1 is a diagram schematically showing an overall configuration of a pull print system using an MFP (Multi-Functional Peripheral) in a first embodiment of an image forming apparatus in the present invention.

Referring to FIG. 1, the pull print system includes MFPs 100A and 100B, a print server 200, and a billing server 300. These devices are connected to a network. The number of MFPs included in the pull print system is not limited to two as shown in FIG. 1 and may be one or may be three or more. In this specification, MFP 100A and MFP 100B are hereinafter collectively referred to as MFP 100 if appropriate.

Figure 2:
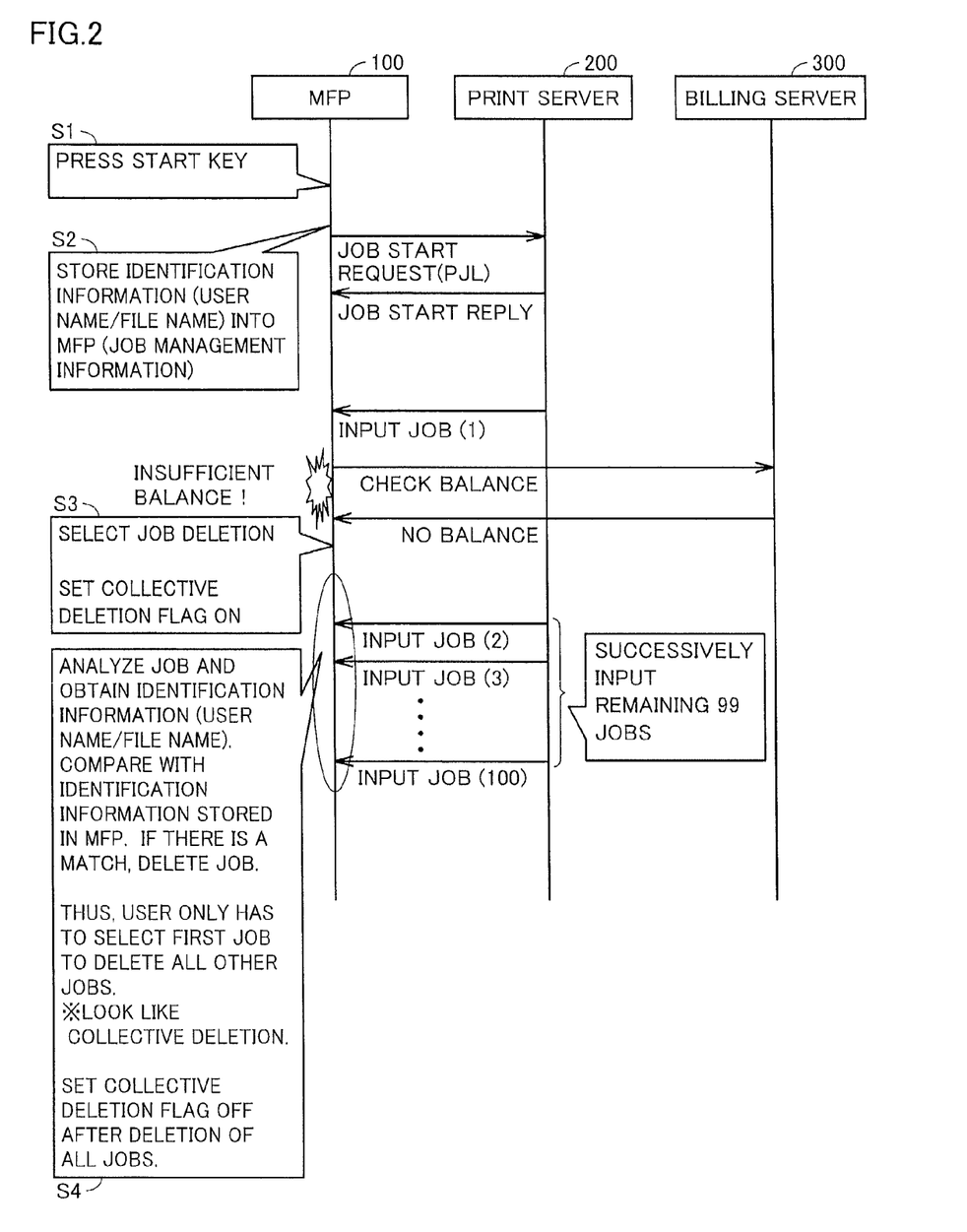
FIG. 2 illustrates an overview of an operation in the pull print system in FIG. 1.

FIG. 2 illustrates an overview of an operation in the pull print system in FIG. 1.

Referring to FIG. 2, in the present pull print system, MFP 100 accepts an instruction to execute a job stored in print server 200, for example, by accepting an operation on a print key in MFP 100 (step S1) and then requests print server 200 to start the job (step S2). The request is implemented by transmitting a PJL (printer job language) command for asking for the job.

MFP 100 accepts user's login before accepting an instruction to execute a job. MFP 100 thus stores the job designated to be executed and the user who designates the job to be executed in association with each other. In this specification, the information that associates them is referred to as "job management information."

Print server 200 instructs MFP 100 to start the job in response to the request. Then, print server 200 transmits print data of the job included in the request to MFP 100.

As an example, it is assumed that the request is to request execution of 100 jobs, namely, a job (1) to a job (100).

In this case, print server 200 transmits (inputs) print data of the job (1) to MFP 100 after the response to instruct to start the job (job start response).

In response to the job start response, MFP 100 asks billing server 300 whether the user who instructs to execute these jobs can be billed (for the expenses required to execute the job (1) to the job (100)). This inquiry is implemented by MFP 100 transmitting, to billing server 300, information identifying the user who instructs to execute these jobs and the amount of money required to execute these jobs, to ask billing server 300 whether this amount can be charged to the user ("check balance" in FIG. 2). As to the charged amount for job execution, for example, MFP 100 may specify a certain amount for each job or may specify the amount according to the data volume for each job.

Billing server 300 stores billing information for each user. Upon accepting the inquiry as to whether billing is possible from MFP 100, billing server 300 replies as to whether it is possible, based on the stored information. For example, if it is determined that billing is possible, billing server 300 subtracts the charged amount from the amount specified in the billing information of the user and transmits information indicating that billing is possible (billing is completed) to MFP 100. On the other hand, if it is determined that billing is impossible, billing server 300 transmits an indication as such to MFP 100.

If the reply from billing server 300 is that billing is possible, MFP 100 forms an image of print data of each job received from print server 200. On the other hand, if the reply from billing server 300 is that billing is impossible, MFP 100 displays a screen in MFP 100 to inquire as to whether to delete the print data, after receiving print data of the print job. FIG. 2 illustrates a sequence in the case where the reply from billing server 300 is that billing is impossible. Then, in FIG. 2, such a reply from billing server 300 to MFP 100 is shown as "no balance."

As the screen for inquiry as to whether to delete the print data as described above, MFP 100 displays a screen for entering an instruction to delete print data of each job requested to be executed by the user who logs in now. MFP 100 then receives the print data of each job from print server 200 and deletes the print data designated by the user to be deleted.

In MFP 100, in a case where there is more than one job targeted for the inquiry as to whether to delete print data, a screen for accepting designation as to whether to collectively delete these jobs may be displayed as the screen for inquiry. Then, if collective deletion is designated, MFP 100 sets a collective deletion flag ON and executes a process for collectively deleting print data of a plurality of jobs requested to be executed.

<Configuration of MFP>

Figure 3:
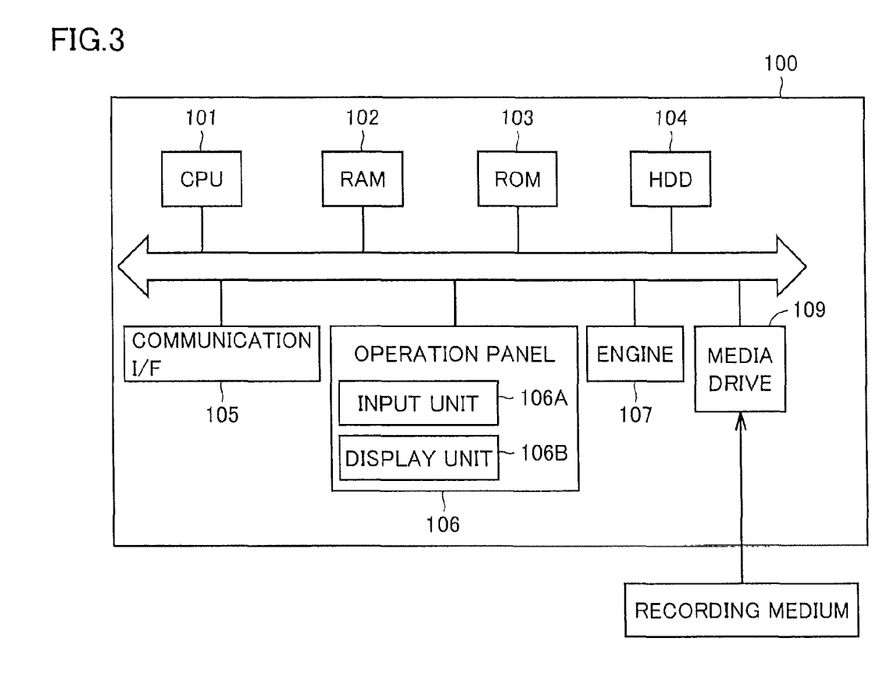
FIG. 3 shows a control block of the MFP.

FIG. 3 shows a control block of MFP 100.

Referring to FIG. 3, MFP 100 includes a CPU (Central Processing Unit) 101 performing control of the device as a whole, a RAM (Random Access Memory) 102 for temporarily storing data, a ROM (Read Only Memory) 103 for storing programs, constants, and so on, a hard disk drive (HDD) 104 for storing image data, a communication interface (I/F) 105 for connecting to the network, an operation panel 106 accepting input operation from a user, and an engine 107 executing an image forming operation and an image scanning operation. Engine 107 includes, for example, a printer performing an image forming operation and a scanner performing an image scanning operation. Operation panel 106 includes an input unit 106A formed of, for example, a touch sensor, and a display unit 106B formed of, for example, a liquid crystal display.

A program executed by CPU 101 may be stored in a recording medium removable from MFP 100, in place of ROM 103. CPU 101 reads the program stored in the recording medium through a media drive 109. Such a recording medium includes a CD-ROM (Compact Disk-Read Only Memory), a DVD-ROM (Digital Versatile Disk-Read Only Memory), a USB (Universal Serial Bus) memory, a memory card, an FD (Flexible Disk), a hard disk, a magnetic tape, a cassette tape, an MO (Magnetic Optical Disk), an MD (Mini Disk), an IC (Integrated Circuit) card (excluding memory cards), an optical card, a mask ROM, an EPROM, an EEPROM (Electrically Erasable Programmable Read Only Memory) or any other medium storing a program in a nonvolatile manner.

<Operation of MFP>

Figure 4:
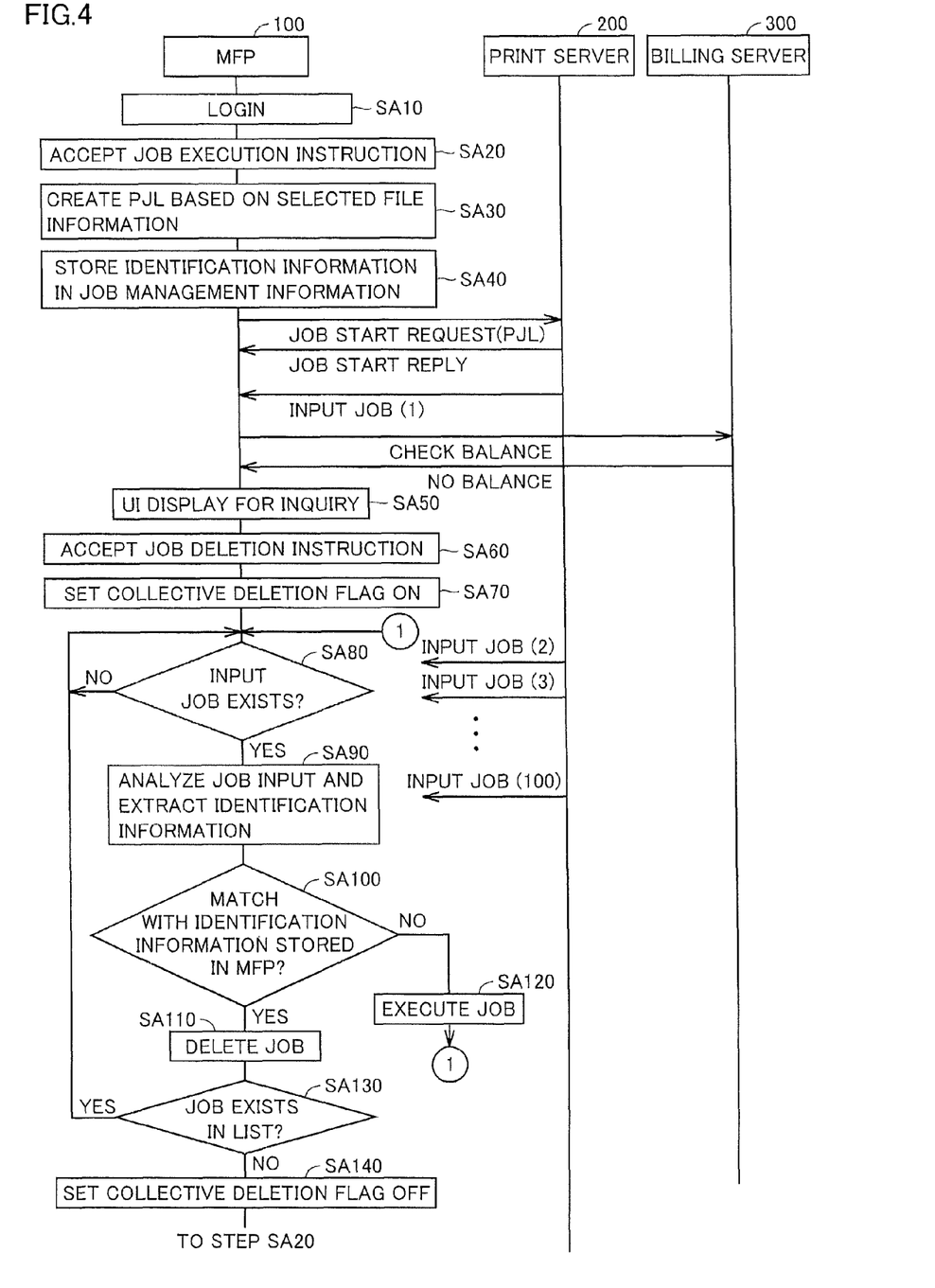
FIG. 4 is a sequence diagram for each element in the pull print system for implementing the operation illustrated in FIG. 2.

FIG. 4 is a sequence diagram for each element in the pull print system for implementing the operation illustrated in FIG. 2.

Referring to FIG. 4, in MFP 100, when an application (hereinafter referred to as "pull print application" if appropriate) for executing a job accumulated in print server 200 is activated, first, login of a user is accepted in step SA10. The process then proceeds to step SA20.

In step SA10, CPU 101 accepts, for example, input of a user name and a password. Then, CPU 101 transmits the accepted user name and password to print server 200. Combinations of user names and passwords of one or more users are stored as user information in print server 200. Then, if the combination of user name and password received from MFP 100 is stored in print server 200, information indicating that the login in step SA10 is successful is transmitted to MFP 100. The combinations of user names and passwords may be stored in MFP 100. In this case, whether login is successful is determined by CPU 101 comparing the input combination with the stored combinations.

CPU 101 proceeds to step SA20 only when the login is successful. If the login is failed, input of login information (user name and password) is requested again.

In step SA20, CPU 101 accepts an instruction to execute a job, and the process proceeds to step SA30. In step SA20, CPU 101 executes, for example, the process as follows. Specifically, CPU 101 requests a list of the registered jobs from print server 200. In response, print server 200 transmits to MFP 100 a list of jobs registered in print server 200 in association with the user who logs in to MFP 100. Then, CPU 101 allows display unit 106B to display the list of jobs received from print server 200. Then, CPU 101 accepts an instruction to execute a job by accepting input of information that specifies a job from the displayed list of jobs.

In step SA30, CPU 101 creates a PJL command for requesting start of the jobs for which execution instruction is accepted in step SA20, and the process proceeds to step SA40.

In step SA40, CPU 101 creates job management information with the identification information of the jobs for which execution instruction is accepted in step SA20, and stores the job management information in RAM 102 or the like. The process then proceeds to step SA50.

Figure 5:
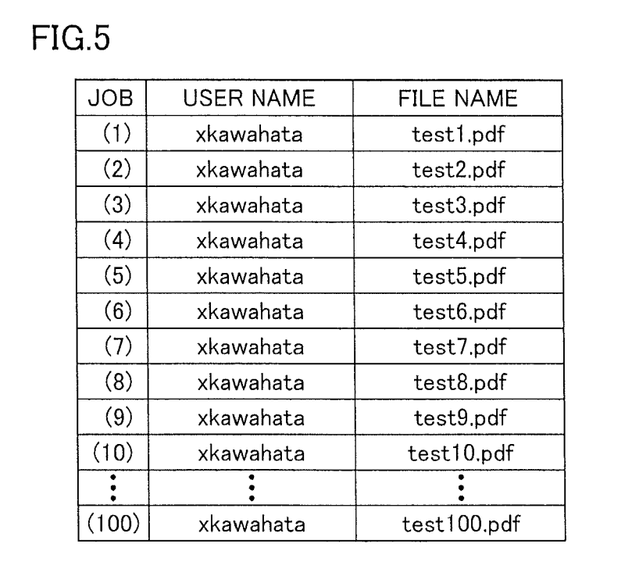
FIG. 5 is a diagram schematically showing an example of contents of job management information.

The contents of the job management information will now be described.

FIG. 5 is a diagram schematically showing an example of contents of the job management information.

Referring to FIG. 5, in the job management information, a user name and a file name are stored in association with each other for each job. For example, in the job management information of the job (1) in FIG. 5, a user name "xkawahata" and a file name "test1.pdf" are stored. In creating the job management information, CPU 101 obtains the user name input by the user for login in step SA10, as the "user name" in the job management information. CPU 101 additionally obtains the file name of the file corresponding to the job for which execution instruction is accepted in step SA20, as the "file name" in the job management information.

Returning to FIG. 4, after saving the job management information in step SA40, CPU 101 transmits the PJL command created in step SA30 to print server 200 (job start request).

Print server 200 transmits a job start response to MFP 100 in response to the job start request. Then, print server 200 successively transmits to MFP 100 print data of the jobs requested to be executed by the job start request. In FIG. 4, "input" means transmission of print data corresponding to the job. For example, "input the job (1)" means that print data of the job (1) is transmitted from print server 200.

CPU 101 transmits to billing server 300 an inquiry as to whether billing is possible for the jobs for which execution instruction is accepted in step SA20 (check balance).

In response, billing server 300 transmits a reply as to whether billing is possible to MFP 100.

In FIG. 4, a reply in the case where billing is impossible (no balance) is shown as is the case with FIG. 2.

Upon receiving the reply that billing is impossible from billing server 300, in step SA50, CPU 101 indicates that the jobs for which execution instruction is accepted in step SA20 cannot be executed due to the insufficient balance of the user in billing server 300 and allows display unit 106B to display a UI (User Interface) to ask the user whether to delete print data of these jobs.

When the user inputs information to instruct to delete the print data on the UI display in step SA50, CPU 101 accepts the input of information (step SA60).

Upon receiving the instruction to delete the print data in step SA60, CPU 101 sets the collective deletion flag ON in step SA70. The process then proceeds to step SA80.

In step SA80, CPU 101 determines whether the print data (the input job) received from print server 200 is stored in HDD 104. If it is determined that it is stored, the process proceeds to step SA90.

In step SA90, CPU 101 extracts the file name of the print data and the user name of the user who inputs the instruction to form an image of the print data by analyzing the information that configures the input job (the print data stored in HDD 104). The process then proceeds to step SA100.

In step SA100, CPU 101 determines whether the user name and file name extracted in step SA90 matches with the combination of user name and file name of the job whose deletion-completed flag is set OFF in the job management information. If it is determined that there is a match, the process proceeds to step SA110. If it is determined that there is no match in the job management information, the process proceeds to step SA120.

In step SA120, CPU 101 allows engine 107 to execute the job (execute image formation of the print data). The process then returns to step SA80.

On the other hand, in step SA110, CPU 101 deletes the job (print data) corresponding to the identification information extracted in step SA90, from HDD 104, and deletes the information of the job in the job management information. The process then proceeds to step SA130.

In step SA130, CPU 101 determines whether the information of the job is registered in the job management information as described with reference to FIG. 5. If it is determined that it is registered, the process returns to step SA80. On the other hand, if it is determined that such a job does not exist, the process proceeds to step SA140.

In step SA140, CPU 101 sets the value of the collective deletion flag OFF, which is set ON in step SA70. The process then returns to step SA20.

In the process described above with reference to FIG. 4, MFP 100 accepts an instruction to execute a job accumulated in print server 200 (step SA20), then transmits a request to start the job (job start request), and asks billing server 300 whether billing to the user is possible for the job (check balance).

Then, if billing to the user is possible, MFP 100 executes image formation of the print data of the job designated to be executed. Specifically, MFP 100 receives the print data from print server 200, stores the print data in HDD 104 (or RAM 102), and allows engine 107 to form an image of the print data. On the other hand, if billing to the user is impossible ("no balance" from the billing server), MFP 100 prompts the user to input an instruction to delete the print data of the job designated to be executed (step SA50). Upon input of the deletion instruction (step SA60), MFP 100 receives the print data of each job from print server 200, stores the print data into HDD 104 or RAM 102, and then deletes the stored print data (step SA110).

MFP 100 determines whether the print data received from print server 200 is the print data designated to be deleted by comparing the identification information of the received print data with the identification information registered in the job management information. Specifically, if the identification information is matched, it is determined that the stored print data is print data to be deleted. If the identification information is not matched, it is determined that the stored print data is print data received to be executed in MFP 100 (step SA120).

In the present embodiment, MFP 100 receives the print data of each job from print server 200 for all the jobs for which execution instruction is input, regardless of whether they can be executed according to the billing information of the user. Then, if the received print data corresponds to the job whose deletion-completed flag is set OFF in the job management information (YES in step SA100), the stored print data is deleted.

Accordingly, when any event that prevents the print data accumulated beforehand in print server 200 from being executed in MFP 100 arises later, the print data is prevented from being left without being downloaded from print server 200.

In addition, accumulation of print data of unnecessary jobs in print server 200 is avoided without requiring modifications to an application in print server 200, because the print data is deleted in MFP 100.

Once the print data of the job is deleted in MFP 100, the information corresponding to the deleted job is deleted in the job management information.

Figure 6:
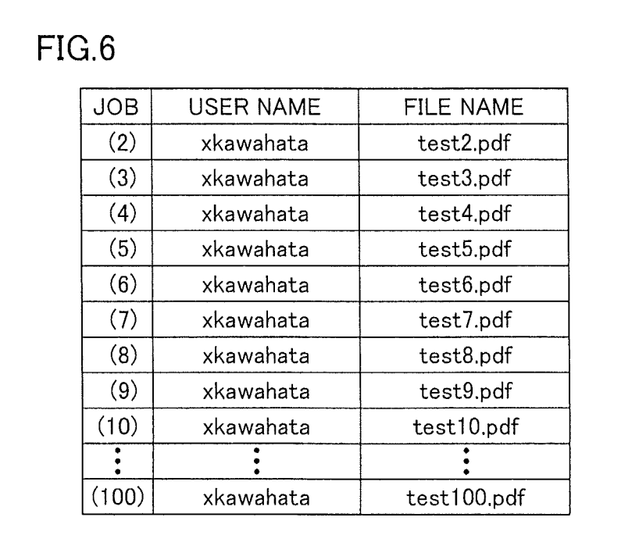
FIG. 6 is a diagram showing an example of the updated job management information in FIG. 5.

FIG. 6 shows the state in which the job management information stored in MFP 100 is updated from the state shown in FIG. 5 as a result of deletion of the print data of the job (1). In the job management information in FIG. 6 as compared with the job management information in FIG. 5, the information of the job (1) is deleted.

In MFP 100, information of each job is also deleted from the job management information when the job is executed.

In MFP 100, the print data downloaded from print server 200 may be deleted when each job is executed. When print data is deleted in this case, the information of the deleted job is also deleted from the job management information.

<Example of Screen Display>

In the present embodiment, in step SA50, CPU 101 allows display unit 106B to display the UI to ask the user whether to delete the print data of the job designated to be executed in step SA20.

Figure 7:
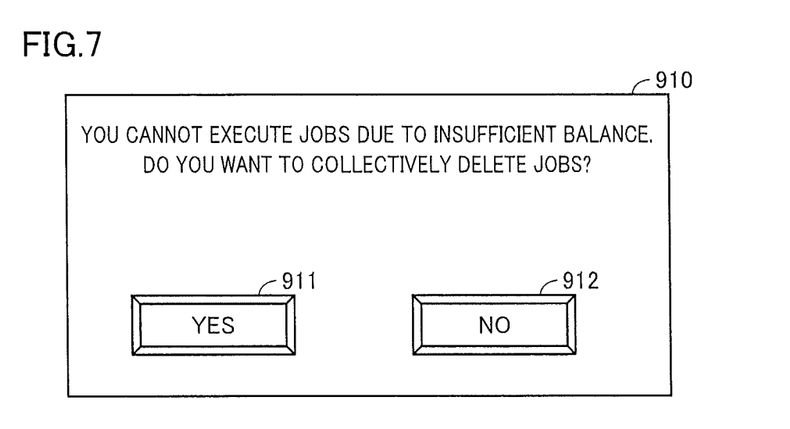
FIG. 7 shows an example of a screen appearing on a display unit of the MFP.

FIG. 7 shows an example of a screen appearing on display unit 106B in this case. Displayed in a screen 910 is a message "Do you want to collectively delete the jobs?" with a button 911 operated to instruct to delete the print data and a button 912 to input an intent not to delete the print data. When button 911 is operated, CPU 101 accepts an instruction to delete all the jobs designated to be executed in step SA20, in step SA60, and executes the process for deleting print data of each job in step SA70 and subsequent steps.

On the other hand, when button 912 is operated, CPU 101 stores the print data of the job downloaded from print server 200 into HDD 104 of MFP 100 without executing the process after step SA70.

Figure 8:
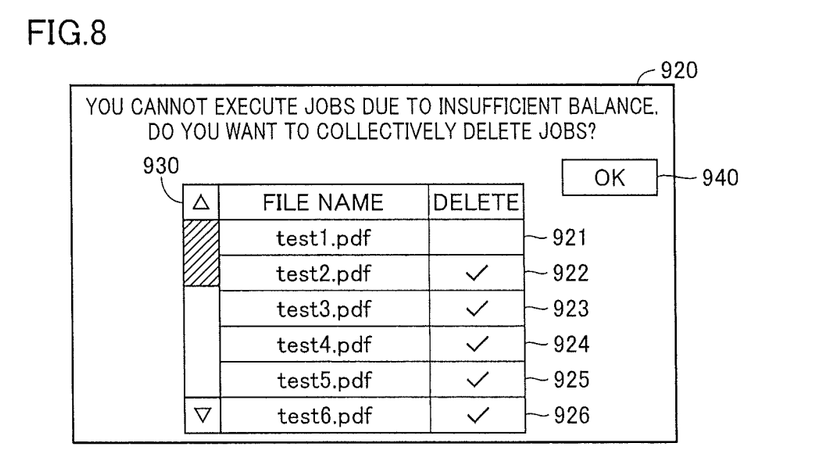
FIG. 8 shows another example of a screen appearing on the display unit of the MFP.

The UI display appearing on display unit 106B in step SA50 may be the one that designates deletion of print data for each of the jobs for which execution instruction is accepted in step SA20. FIG. 8 shows an example of the screen appearing on display unit 106B in step SA50 in such a case.

Referring to FIG. 8, in a screen 920, a field (fields 921 to 926) for inputting information for designating deletion is displayed for the file name of each print data of the job for which execution instruction is accepted in step SA20. In screen 920, the file names and the corresponding entry fields are shown for part of the jobs designated to be executed in step SA20. When a scroll bar 930 is operated as appropriate, CPU 101 selects a file name and an entry field displayed in screen 920 from among the jobs designated to be executed in step SA20. A tick is displayed in the deletion field corresponding to the file name selected as a file to be deleted. In FIG. 8, five files, namely, test2.pdf to test6.pdf, are selected. In this state, when an OK button 940 is operated, CPU 101 accepts an instruction to delete the jobs selected in this manner, in step SA60. Then, in this case, the process in step SA70 is skipped, and the process proceeds to step SA80. In this case, in step SA60, CPU 101 leaves information only for the job designated to be deleted in the job management information. In other words, the corresponding information for the job not selected is deleted from the job management information.

Thus, in step SA110, only the job designated to be deleted is deleted, among the print data designated to be executed in step SA20 and received from print server 200.

Second Embodiment

<Operation Manner of System>

In the first embodiment, as described with reference to FIG. 8, print data of the job that is neither executed in MFP 100 nor designated to be deleted is left in HDD 104 (or RAM 102). In the pull print system in the present embodiment, an instruction to execute the corresponding job for the print data left in this manner is accepted.

Figure 9:
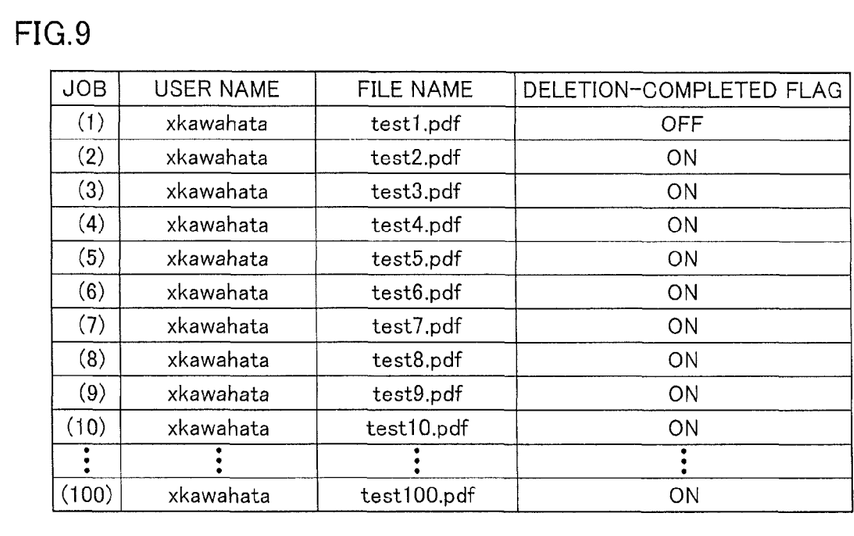
FIG. 9 is a diagram showing an example of contents of the job management information.

FIG. 9 is a diagram showing an example of the job management information created in this embodiment.

Referring to FIG. 9, in the job management information in the present embodiment, a state of "deletion-completed flag" is registered for each job, in addition to the job management information described with reference to FIG. 5, etc. This state is shown by ON or OFF. In FIG. 9, the information for the job (1) to the job (100) is registered, wherein only the "deletion-completed flag" of the job (1) is set OFF, and the "deletion-completed flags" of the other jobs are set ON.

Figure 10:
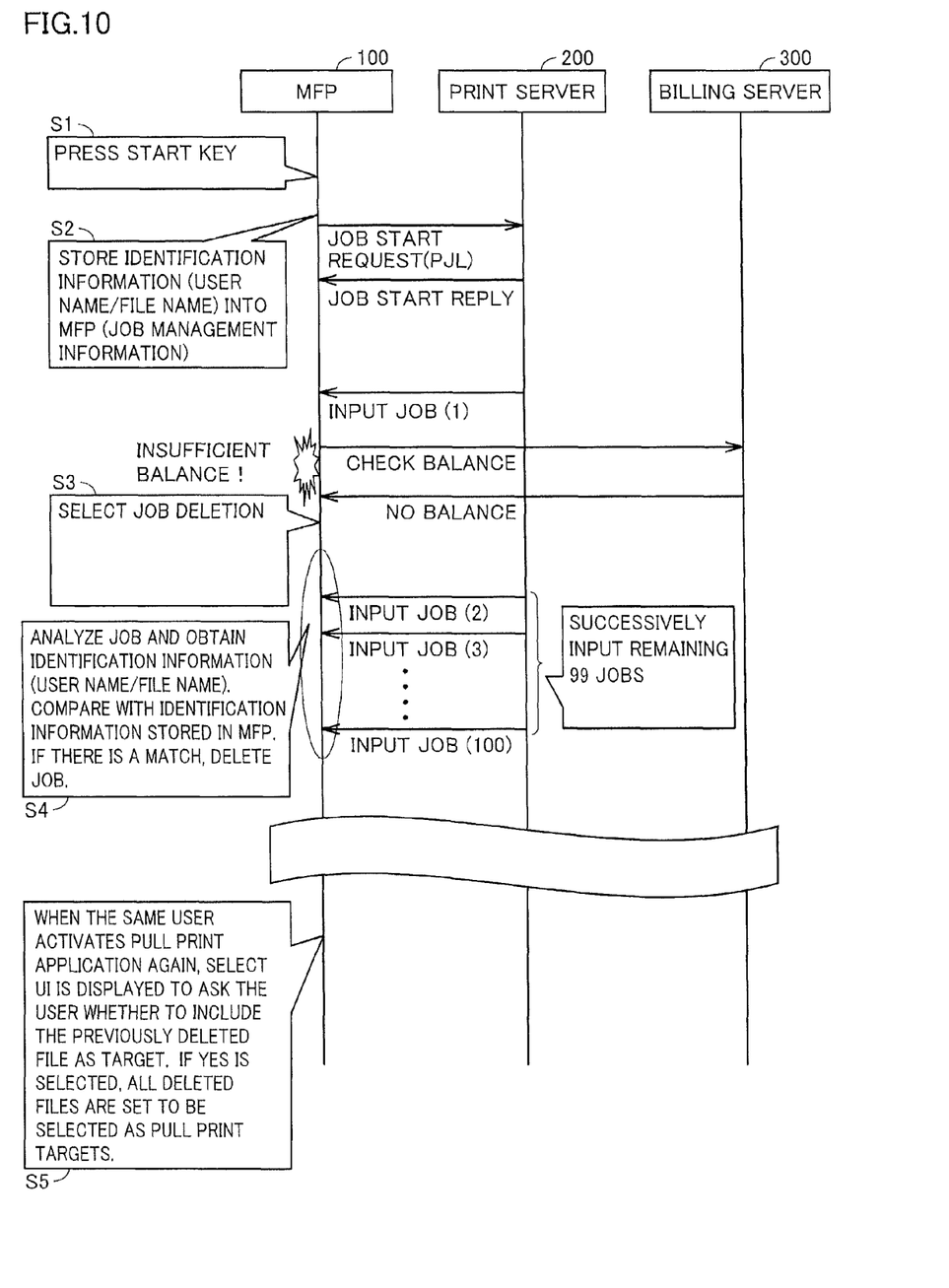
FIG. 10 is a sequence diagram showing an overview of an operation of the pull print system including a second embodiment of the image forming apparatus in the present invention.

FIG. 10 is a sequence diagram showing an overview of an operation of the pull print system in the present embodiment.

In FIG. 10, MFP 100 accepts an instruction to execute a job from the user (step S1), transmits a job start request to print server 200 based on the instruction (step S2), and then successively receives the print data of the jobs designated to be executed from print server 200 (input of the jobs (1) to the job (100)), in a similar manner as in steps S1 to S4 described with reference to FIG. 2. MFP 100 checks the balance of the login user with billing server 300 for charges for the jobs of which execution instruction is accepted. Then, if receiving a reply of no balance, MFP 100 indicates that the jobs for which execution instruction is accepted cannot be executed and displays a screen (for example, FIG. 8) to accept an instruction to delete them (step S3). Then, when an instruction to delete is accepted, the jobs are deleted. The deletion of the print data turns the deletion-completed flag ON for the corresponding job in the job management information.

On the other hand, if an instruction not to delete the print data is accepted, among print data that is received from print server 200 and fails in image formation due to insufficient balance or the like, the print data is not deleted in MFP 100 and the deletion-completed flag for that job is set OFF in the job management information. Such an instruction is input by operating OK button 940 without operating the entry field (for example, entry field 921) on screen 920 in FIG. 8 (in other words, by operating OK button 940 in a state in which the entry field corresponding to the job is not ticked).

Then, when the same user name as the user name of the job whose deletion-completed flag is set OFF logs in to MFP 100 and activates the pull print application, MFP 100 asks the user whether to select the job as a job designated to be executed again (step S5), on display unit 106B.

Figure 12:
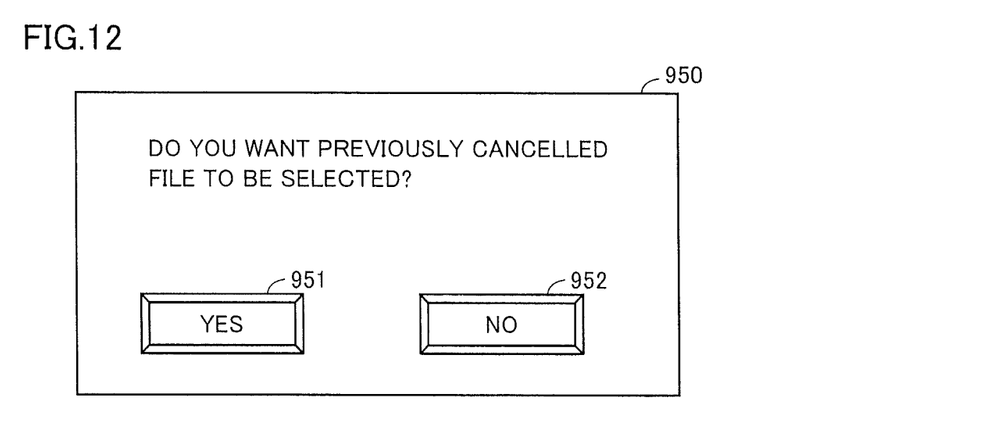
FIG. 12 shows an example of a screen appearing on the display unit of the MFP in FIG. 10.

FIG. 12 shows an example of a screen appearing on display unit 106B of MFP 100 in the present embodiment.

Referring to FIG. 12, displayed in a screen 950 is a message "Do you want the previously cancelled file to be selected?" with a button 951 and a button 952. Button 951 is a button for inputting an instruction to select the job not deleted as a target of the re-execution instruction. Button 952 is a button for inputting information that such selection is not desired.

When button 951 is operated, MFP 100 displays a screen to ask the user whether to select the job as a target of the re-execution instruction, for all the jobs that are associated with the user and whose deletion-completed flags are set OFF in the job management information.

Figure 13:
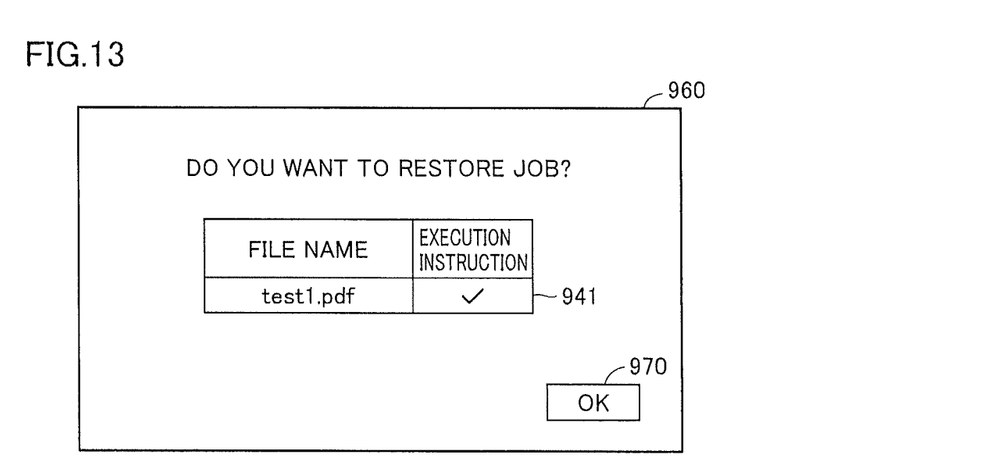
FIG. 13 shows another example of a screen appearing on the display unit of the MFP in FIG. 10.

FIG. 13 shows an example of the screen appearing on display unit 106B in this case.

Referring to FIG. 13, displayed in a screen 960 is a message "Do you want to restore the job?" with a file name and a field for inputting an instruction to execute the job corresponding to the file name. In the example shown in FIG. 13, there is one job (test1.pdf) whose deletion-completed flag is set OFF in the job management information, for the login user, by way of example. When there is more than one job whose deletion-completed flag is set OFF, screen 960 displays the file name of each job and an entry field corresponding to each file name.

On this screen, the user operates the entry field corresponding to the file name, for example, through touch operation, for the file that the user desires to restore (to set the file as a target of execution instruction again). Then, when an OK button 970 is operated, MFP 100 checks the balance of the login user with billing server 300 in order to execute the job for the file name whose entry field is operated. If the balance is sufficient, billing server 300 subtracts the amount required to execute the job from the billing information of the user and thereafter notifies MFP 100 that the balance settlement process is completed for execution of the job. In response to this notice, MFP 100 executes the job designated to be restored (forms an image of print data). If the balance is insufficient, the pull print application is terminated, for example.

<Process in MFP>

Figure 11:
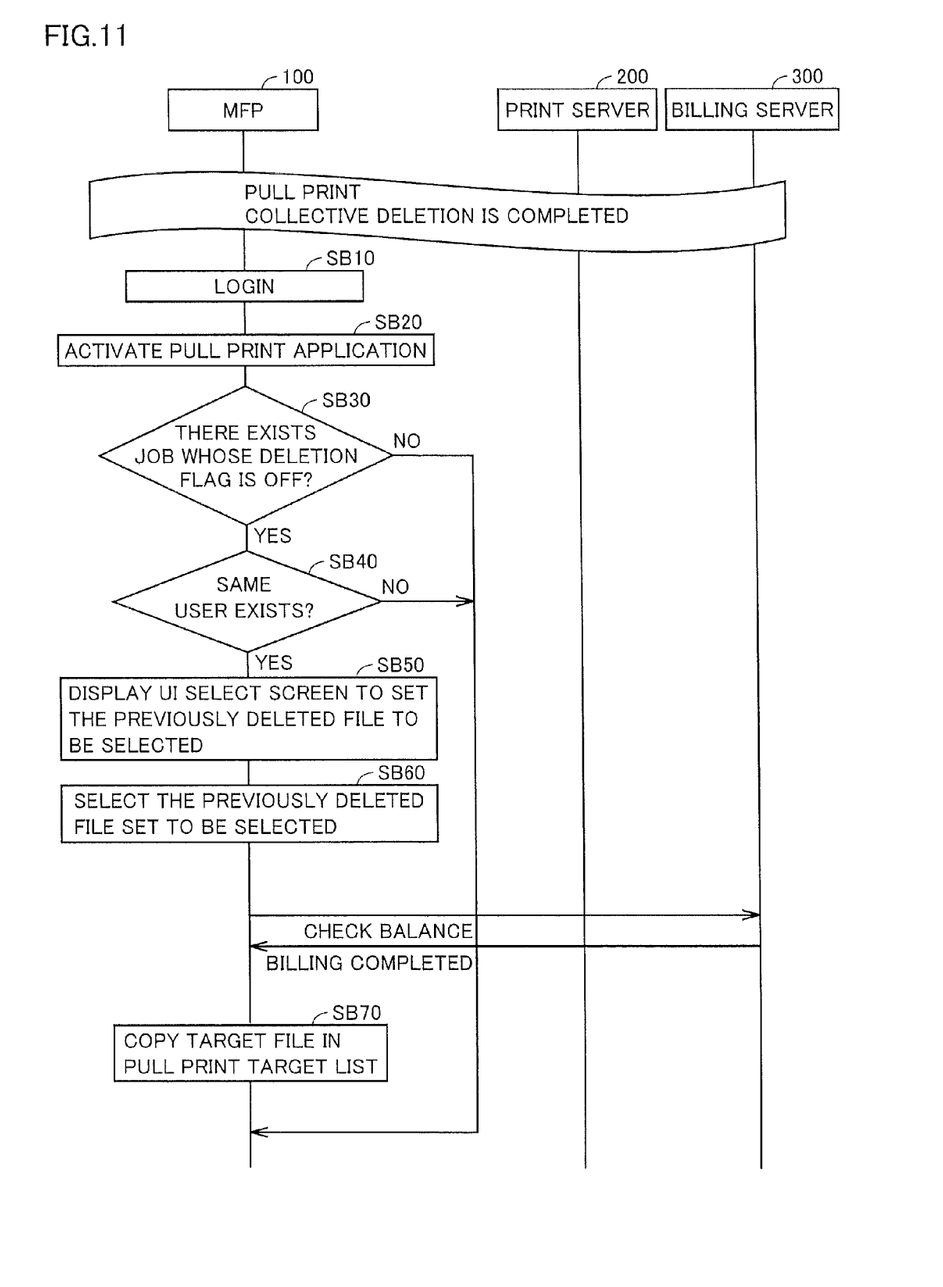
FIG. 11 is a sequence diagram of a process executed in the MFP in FIG. 10.

FIG. 11 is a sequence diagram of a process executed corresponding to step S5 in MFP 100.

Referring to FIG. 11, in step SB10, CPU 101 executes a login operation for the user, and the process proceeds to step SB20. If the user has already logged in, the process in step SB10 is omitted.

In step SB20, CPU 101 activates the pull print application based on an instruction from the user, and the process proceeds to step SB30.

In step SB30, CPU 101 determines whether there exists a job that is associated with the user name of the user whose login is accepted in step SB10 (or the user who has already logged in), and whose deletion-completed flag is set OFF in the job management information. If it is determined that none exists, the process ends. On the other hand, if it is determined that any exists, the process proceeds to step SB40.

In step SB40, CPU 101 determines whether the jobs whose deletion-completion flags are set OFF in the job management information include the one associated with the same user name as the user name of the user whose login is accepted in step SB10 (or the user who has already logged in). If it is determined that any exists, the process proceeds to step SB50. If it is determined that none exists, the process ends.

In step SB50, CPU 101 displays a UI screen as described with reference to FIG. 12 for selecting a job that is previously not executable, as an execution target again. The process then proceeds to step SB60.

In step SB60, as described with reference to FIG. 13, selection of print data (job) serving as an execution target from print data stored in HDD 104 in the not-executable state is accepted. The process then proceeds to step SB70.

In step SB70, CPU 101 executes the job selected as a target of execution instruction in step SB60. The process then ends. Thus, the information of the job is deleted from the job management information. In step SB70, CPU 101 asks billing server 300 whether billing to the target user is possible for execution of the job (check balance), and executes the job on condition that a reply that billing is completed is received from billing server 300.

[Other Modification]

In the foregoing second embodiment, if a job that MFP 100 is instructed to execute cannot be executed due to insufficient balance or the like, the print data of the job from print server 200 is accumulated in HDD 104 in MFP 100. Then, if the user who instructs to execute the job having the print data accumulated logs in to MFP 100 again and activates the pull print application, MFP 100 asks the user whether to set the job as a target of execution instruction again (see, for example, FIG. 12).

Figure 14:
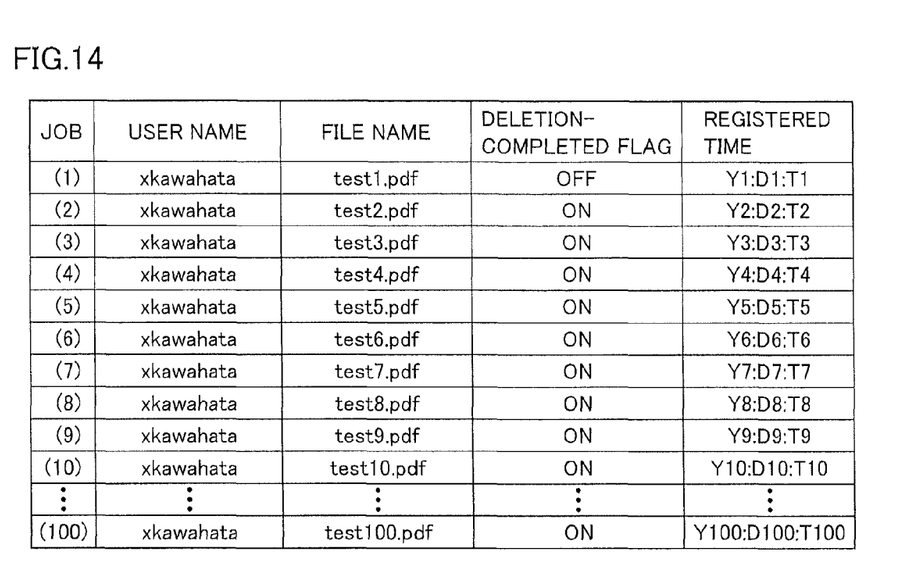
FIG. 14 is a diagram showing a modification of the job management information.

In the pull print system, a period in which such print data can be accumulated can be defined. In this case, the time at which the print data of each job starts being accumulated in HDD 104 is additionally recorded as the job management information as described with reference to FIG. 9. FIG. 14 shows a modification of the job management information in this manner.

Referring to FIG. 14, in the job management information, the time at which accumulation starts (registered time) is stored for each job, in addition to the user name, the file name, and the state of the deletion-completed flag. CPU 101 registers the time at which each print data is accumulated in HDD 104, as the registered time, in the job management information.

Then, CPU 101 deletes the print data of the corresponding job from HDD 104 and deletes the information corresponding to the job in the job management information on condition that a predetermined certain time has elapsed.

In the embodiments above, the reason why the job designated to be executed cannot be executed in MFP 100 is insufficient balance of the user who instructs to execute the job in billing server 300, by way of example. However, the reason is not limited thereto. Examples of the reason include an error in MFP 100 such as toner out, paper out, and paper jam.

According to the foregoing embodiments, the image forming apparatus receives from the print server all print data for which the image forming apparatus is instructed to form an image. After an instruction of image formation is input to the image forming apparatus, the print data of the job that fails in image formation is prevented from being left in the print server. In other words, such print data can be subjected to appropriate processing such as deletion in the image forming apparatus after it is downloaded to the image forming apparatus. Accordingly, the print data as described above is prevented from being left in the print server, without requiring modifications to an application, etc. in the print server.

In the embodiments, MFP 100 waits for input from the user in step S3 in FIG. 2 or FIG. 10 and thereafter executes deletion of print data of the job that cannot be executed due to insufficient balance or the like. However, the print data may be deleted without a wait for such input. In other words, MFP 100 may delete print data of the job that cannot be executed, after giving a notice, for example, by displaying a message that the job cannot be executed on display unit 106B, without waiting for input from the user.

It is intended that the invention described in the embodiments should be carried out solely or in combination if possible.

According to the embodiment, the print job as described above (print data) is prevented from being left in the print server, without requiring modifications to an application, etc. in the print server.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus connectable to a print server in which a print job is stored, comprising:
   an input unit for accepting an execution start instruction for said print job stored in said print server;
   a receiving unit for receiving said print job, from said print server;
   a storage unit for storing said received print job; and
   a determination unit for determining whether execution of said print job received from said print server is permitted,
   wherein when said determination unit determines that execution of said print job is not permitted, and an instruction to delete said print job is input to said input unit, said determination unit deletes said print job from said storage unit.

2. The image forming apparatus according to claim 1, wherein
   said input unit further accepts an instruction to collectively delete a plurality of print jobs, and
   said determination unit collectively deletes a plurality of print jobs received by said receiving unit, if said instruction to collectively delete is input.

3. The image forming apparatus according to claim 1, wherein said determination unit accepts login of a user and determines whether print data is a deletion target based on login information of the login user.

4. The image forming apparatus according to claim 3, further comprising:
   a display device wherein
   said storage device stores said received print job in association with a login user at the time of reception, and
   if login of a user is accepted and said user is associated with a print job that is not permitted to be executed, said determination unit allows said display device to display information to inquire about input of an execution instruction for said print job.

5. The image forming apparatus according to claim 1, further comprising an execution unit for executing a print job, wherein
   if an execution instruction is input to said input unit for a print job that is not permitted to be executed, said determination unit determines again whether image formation of said print job is permitted, and if it is determined that it is permitted, allows said execution unit to execute said print job.

6. The image forming apparatus according to claim 1, wherein
   said image forming apparatus is further connectable to a billing server, and
   said determination unit (i) transmits an inquiry to said billing server regarding whether billing is possible for execution of the print job for which execution start instruction is input to said input unit, and (ii) determines whether execution of said print job is possible based on a result of said inquiry.

7. The image forming apparatus according to claim 1, wherein when said input unit accepts an instruction to delete a plurality of print jobs collectively, said receiving unit receives said plurality of print jobs from said print server, and said determination unit deletes said plurality of print jobs received by said receiving unit.

8. A method of controlling an image forming apparatus connectable to a print server in which a print job is stored, said image forming apparatus including a storage device and an execution unit for executing image formation of print data, comprising the steps of:
   accepting, by an accepting unit of said image forming apparatus, input of an execution start instruction for said print job stored in said print server;
   receiving, by a receiving unit of said image forming apparatus, said print job, from said print server;
   storing, in the storage device of said image forming apparatus, said print job received from said server;
   determining, by a determination unit of said image forming apparatus, whether execution of said print job received from said print server is permitted; and
   when it is determined that execution of said print job is not permitted and an instruction to delete said print job is input, deleting said print job from said storage unit.

9. The method according to claim 8, further comprising the step of accepting login of a user, wherein
   said step of determining determines whether print data is a deletion target based on login information of the login user.

10. The method according to claim 9, wherein
said image forming apparatus further includes a display device, and
said method further comprises the steps of:
   storing said received print job in said storage device in association with a login user at the time of reception; and
   if login of a user is accepted and said user is associated with a print job that is not permitted to be executed, allowing said display device to display information to inquire about input of an execution instruction for said print job.

11. The method according to claim 8, wherein if said step of accepting input accepts input of an execution instruction for a print job determined to be not executable, the method further comprising:
   determining again whether image formation of said print job is permitted;
   if it is determined that it is permitted, allowing said execution unit to execute said print job.

12. The method according to claim 8, wherein
said image forming apparatus is further connectable to a billing server, and
said method further comprises the steps of:
   transmitting an inquiry to said billing server as to whether billing is possible for execution of a print job for which execution start instruction is input; and
   determining whether execution of said print job for which execution start instruction is input is permitted, based on a result inquiry transmission.

13. The method according to claim 8, wherein when said input unit accepts an instruction to delete a plurality of print jobs collectively, the method further includes:
   receiving, by said receiving unit, said plurality of print jobs from said print server; and
   deleting, by said determination unit, said plurality of print jobs received by said receiving unit.

14. A non-transitory, computer-readable recording medium encoded with a program executable by a computer of an image forming apparatus including a storage device and an execution unit for executing image formation of print data,
   said image forming apparatus being connectable to a print server in which a print job is stored,
   said program causing said computer of said image forming apparatus to execute the steps of:
      accepting input of an execution start instruction for said print job stored in said print server;
      receiving said print job from said print server;
      storing said received print job;
      determining whether execution of said print job received from said print server is permitted; and
      when it is determined that execution of said print job is not permitted and an instruction to delete said print job is input, deleting said print job from said storage unit.

15. The recording medium according to claim 14, wherein
said program causes said computer to further execute the step of accepting login of a user, and
said step of determining determines whether print data is a deletion target based on login information of the login user.

16. The recording medium according to claim 15, wherein
said image forming apparatus further includes a display device, and
said program causes said computer to further execute the steps of:
   storing said received print job in said storage device in association with a login user at the time of reception; and
   if login of a user is accepted and said user is associated with a print job that is not permitted to be executed, allowing said display device to display information to inquire about input of an execution instruction for said print job.

17. The recording medium according to claim 14, wherein if said step of accepting input accepts input of an execution instruction for a print job determined to be not executable, said program causes said computer to further execute the steps of:
   determining again whether image formation of said print job is permitted; and,
   if it is determined that it is permitted, allowing said execution unit to execute said print job.

18. The recording medium according to claim 14, wherein
said image forming apparatus is further connectable to a billing server, and
said program causes said computer to further execute the steps of:
   transmitting an inquiry to said billing server as to whether billing is possible for execution of a print job for which execution start instruction is input; and
   determining whether execution of said print job for which execution start instruction is input is permitted, based on a result of said inquiry transmission.

19. The recording medium according to claim 14, wherein when said input unit accepts an instruction to delete a plurality of print jobs collectively, said program further causes said computer of said image forming apparatus to execute the steps of:
   receiving said plurality of print jobs from said print server; and
   deleting said plurality of print jobs received by said receiving unit.

* * * * *